(12) United States Patent
Wilson

(10) Patent No.: US 6,604,720 B1
(45) Date of Patent: Aug. 12, 2003

(54) PORTABLE PC WORK STATION

(76) Inventor: Wilbert J. Wilson, 4726 Antelope Cir., Fairfield, CA (US) 94585

( * ) Notice: Subject to any disclaimer, the term of this patent is extended or adjusted under 35 U.S.C. 154(b) by 0 days.

(21) Appl. No.: 09/556,720

(22) Filed: Apr. 21, 2000

Related U.S. Application Data (60) Provisional application No. 60/130,485, filed on Apr. 22, 1999.

(51) Int. Cl.[7] .................. F16M 11/02; A47B 91/00; A47G 29/00; B65D 19/00
(52) U.S. Cl. .................. 248/177.1; 248/346.01
(58) Field of Search .......... 248/177.1, 176.1, 248/178.1, 179.1, 180.1, 181.1, 176.3, 82, 84, 86, 88, 346.01, 917, 918; 108/59, 84, 180, 186, 153.1

(56) References Cited

U.S. PATENT DOCUMENTS

| | | | | |
|---|---|---|---|---|
| 5,326,058 A | * | 7/1994 | Beaver et al. | 248/187 |
| 5,769,369 A | * | 6/1998 | Meinel | 248/176.1 |
| 5,992,805 A | * | 11/1999 | Tanner | 248/161 |
| D429,251 S | * | 8/2000 | Study et al. | D14/457 |
| 6,113,050 A | * | 9/2000 | Rush | 248/346.01 |
| 6,213,438 B1 | * | 4/2001 | Otsby et al. | 248/276.1 |

* cited by examiner

Primary Examiner—Ramon O. Ramirez
Assistant Examiner—Jerome A. DeLuca
(74) Attorney, Agent, or Firm—Harold D. Messner (57) ABSTRACT

The present invention relates to a portable laptop computer work station comprising a first work space that includes a planar table of rectangular cross section having an upper surface for receiving a laptop computer, such upper surface terminating in a lip along one of the long sides of the table, and a lower surface fitted a Tee-shaped receiver having a pair of longitudinal legs parallel to the lip at the upper surface and a transverse leg normal to the lip. The planar table is threadably attached at its lower surface to a receiver pad of a conventional camera tripod and provides for additional work spaces to be mechanically supported therefrom via the Tee-shaped receiver.

11 Claims, 9 Drawing Sheets

PORTABLE PC WORK STATION

RELATED APPLICATION

This is a continuation of Ser. No. 60/130,485 filed Apr. 22, 1999 for "PORTABLE P.C. WORK STATION" which is incorporated herein by reference.

SCOPE OF THE INVENTION

The present invention relates to portable p.c. work stations and more particularly to a p.c. station having support elements easily broken apart for easy transport say first by motor vehicle and then by human carriage from the former to a location where the user utilizes a conventional laptop p.c. in association with a printer, paper tray and optical recording device such as a digital camera with CD ROM recording capabilities.

BACKGROUND OF THE INVENTION

Insurance adjusters travel from location to location to view damaged motor vehicles, carrying a laptop computer, digital camera and printer. Experience has shown that a set-up position that utilizes such peripherals is often difficult in a repair shop or usual environments encountered in the field.

SUMMARY OF THE INVENTION

The present invention relates to a portable laptop computer work station comprising a first work space that includes a planar table of rectangular cross section having an upper surface for receiving the laptop computer, such upper surface terminating in a lip along one of the long sides of the table, and a lower surface fitted a Tee-shaped receiver having a pair of longitudinal legs parallel to the lip at the upper surface and a transverse leg normal to the lip.

Into one of the pair of longitudinal legs of the Tee-shaped receiver, a second work space is provided consisting of a first extension planar base of rectangular cross section disconnectably attached via a support header of rectangular cross section that extends beyond one of the short sides of the extension planar base. The upper surface of the extension planar base also terminates in a lip that is parallel to the lip of the planar table of the first work space. The purpose of the first extension planar base comprising the second work space: to provide a surface for supporting computer peripherals including a mouse.

Into the other of the pair of longitudinal legs of the Tee-shaped receiver, a Zee-shaped extension arm of rectangular cross section is attached via one end of such arm and has an opposite end that forms a third work space. That is, such opposite end of the Zee-shaped extension arm is fitted with ball-in-socket fastener for securing an optical recording device, e.g., a digital camera.

Into the transverse leg of the Tee-shaped receiver, a U-shaped extender is disconnectably attached, such extender having a near end slidabley connected to the transverse leg of the Tee-shaped receiver, and a distal end in contact with the undersurface of a second planar base that forms a fourth work space. Such second planar base has an upper surface terminating in a lip along one of the long sides for the purpose of supporting a printer or similar device.

Cantilevering from the U-shaped extender of the fourth work space is a paper tray of rectangular cross section having an upper surface terminating in a lip along one of the long sides and a lower surface fitted with a lot that slidably attaches about the mid-region of the U-shaped extender and a rod assembly including a L-shaped support having a first arm permanently attached to the lower surface of the third planar base and a second arm carrying an opening of circular cross section through which a rod of circular cross section, extends. The distal end of the rod is provided with a conically shaped stop forward thereof, such distal end also extending into and through an opening in the middle of the U-shaped extender for support purposes. Purpose of the planar paper tray: to provide a receiving area for printed pages from the printer.

Support for the entire work station is provided by a conventional camera tripod that includes an attaching pad that disconnectably attaches via a threaded opening in the Tee-shaped receiver of the table. Such camera tripod includes universal positioning linkage that permits the correct positioning of the laptop computer, the mouse, the speakers, the optical recording device, the printer and the printed page receiver relative to the earth's surface. That is, the positioning linkage is manipulated to cant the table carrying laptop (forming the first work space) and first planar base carrying the mouse and speakers relative to earth's surface (and forming the second work space) at a correct interaction position for the user's hands so that the user can use both instruments from a seated or standing position as well as:

positions the Zee-shaped extension arm carrying the optical recording device (forming the third work space) and the second base supporting the printer (and forming the fourth work space) in positions that are parallel to the earth's surface, and positions the planar paper tray at a cant opposite to that of the laptop to receive the printed pages of the printer.

DETAILED DESCRIPTION OF THE INVENTION

Figure 1:
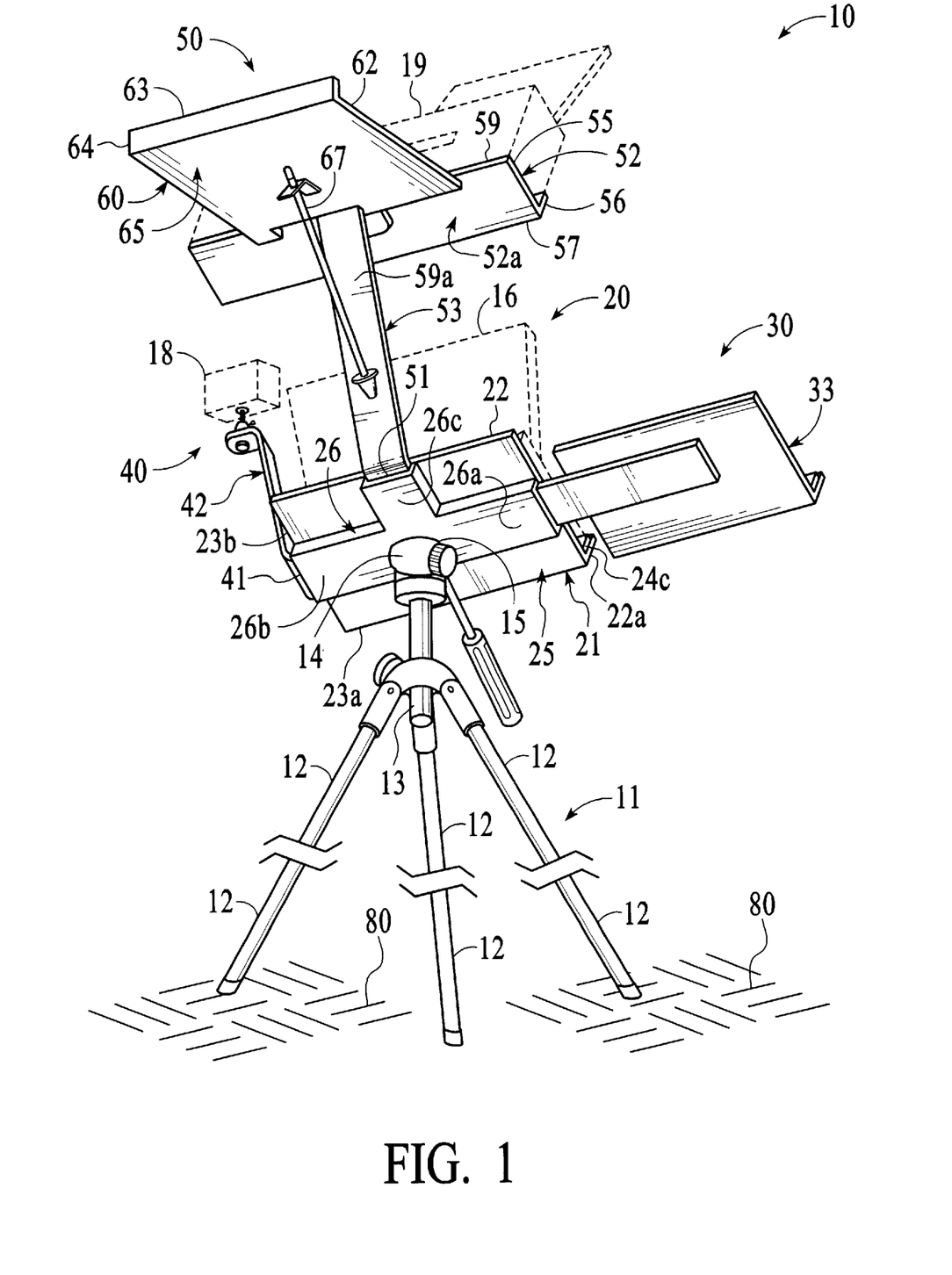
FIG. 1 a bottom oriented perspective view of the work station of the invention.

As shown in FIG. 1, portable laptop computer work station 10 comprises a series of work spaces 20, 30, 40 and 50 that are releasably supported via a conventional camera tripod 11, such as shown in DES. 263, 147 for "Tripod" issued Feb. 23, 1982 that includes telescopic legs 12, center tube 13 and universal tiltable head 14 including seating pad 15. Such tripods 11 are available from Bogen Photo Corporation, Ramsey, N.J. The work spaces 20, 30, 40 and 50 are created at the work site by the user using the tripod 11 attached to work space 20 as the initial building block and then attaching remaining support elements described below in detail and comprising the work spaces 30, 40 and 50 to form the work station 10 of the invention. The work spaces 20, 30, 40 and 50 will now be discussed in detail.

WORK SPACE 20

Figure 2:
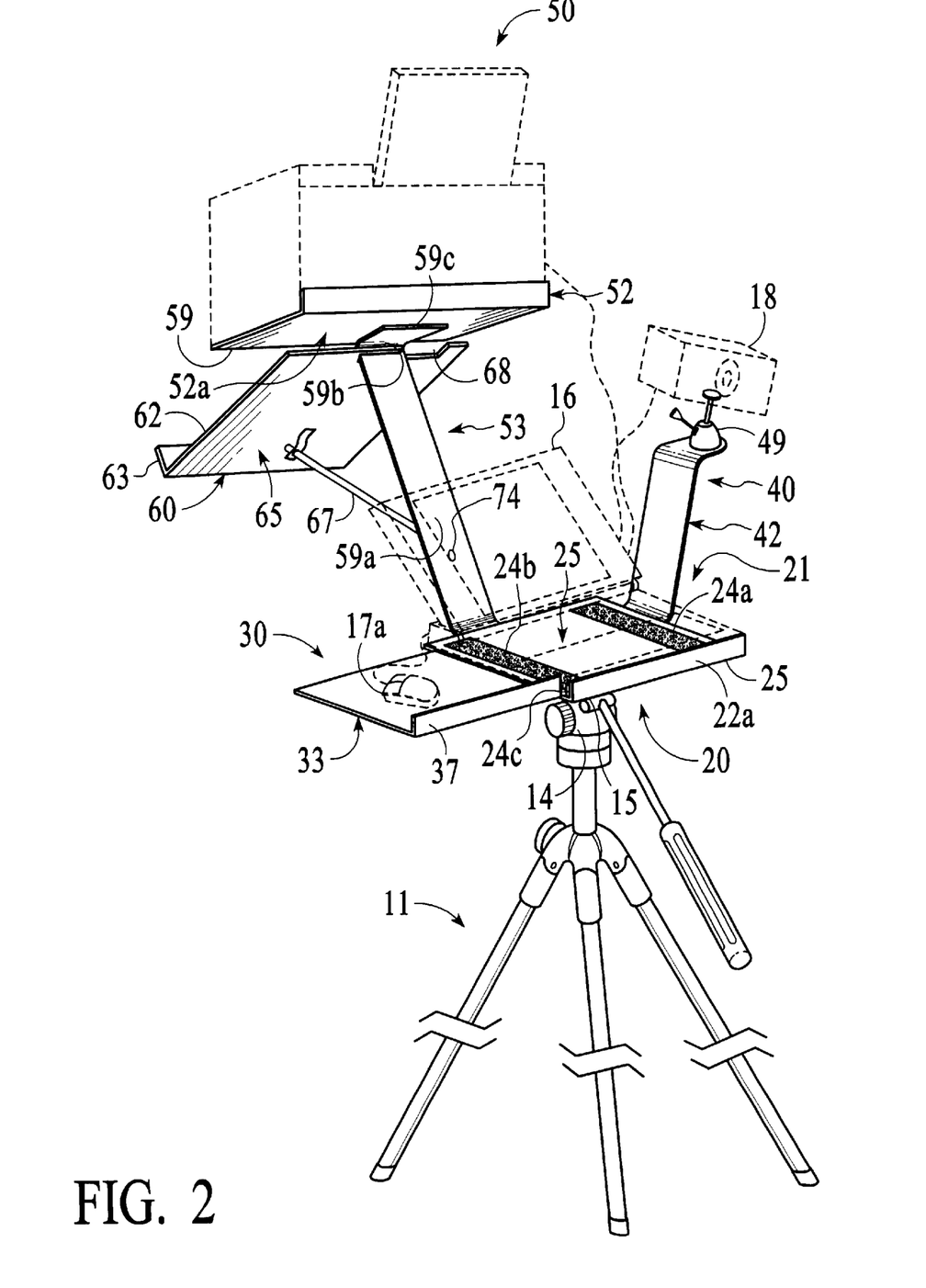
FIG. 2 a frontal oriented perspective view of the work station of the invention illustrating a first, second, third and fourth work space including showing a paper tray.
Figure 3:
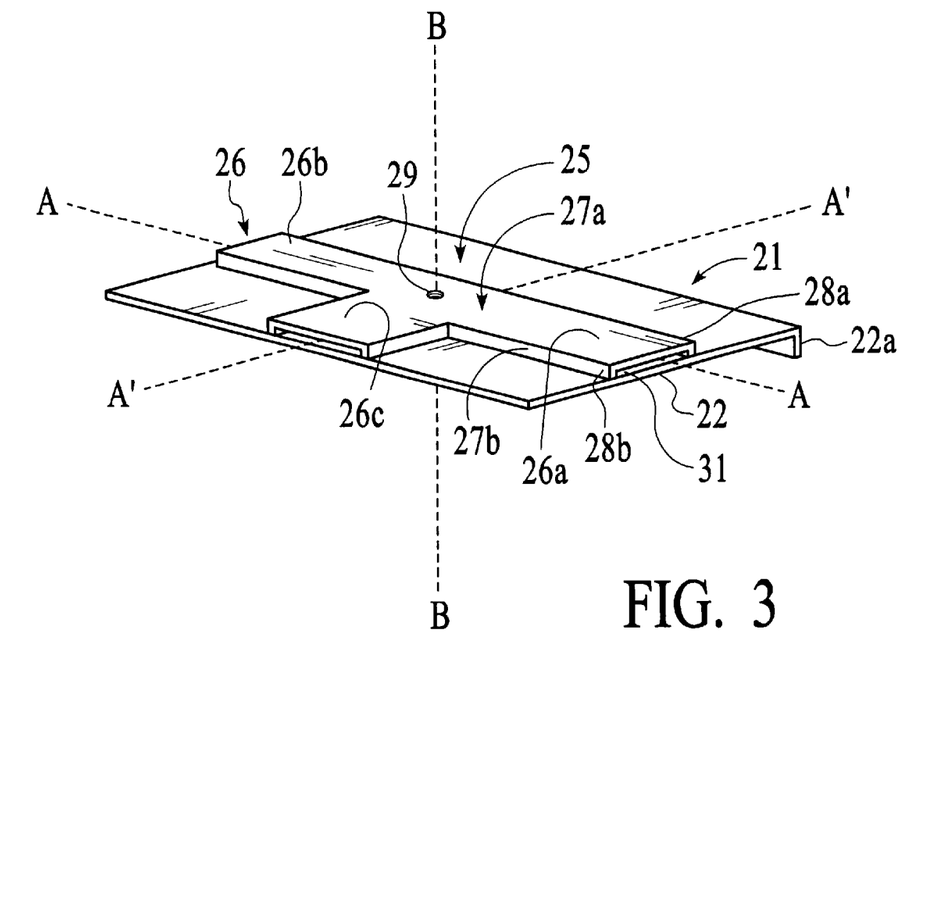
FIG. 3 is a bottom oriented perspective detail of a table used in and featured relative to the formation of the first work space of the work station of FIG. 2.

As shown in FIG. 1, work space 20 includes planar table 21 of rectangular cross section having an upper surface 22 for receiving a laptop computer 16 shown in phantom line, such upper surface 22 ending in a lip 22a along long side 23a of the table 21 normal to short sides 23b and including VELCRO-type inserts 24a, 24b and rubber base 24c, see FIG. 2 for stabilizing the laptop computer 16. A lower surface 25 is also provided for the table 21, such surface 25 being fitted a Tee-shaped receiver 26. As shown in FIG. 3, such Tee-shaped receiver 26 including a pair of longitudinal legs 26a, 26b parallel to the lip 22a at the upper surface 22 of the table 21 and a transverse leg 26c normal to such lip 22a. As shown in FIG. 3, such legs 26a, 26b and 26c are each of rectangular cross section, comprise broad walls 27a, 27b and side walls 28a, 28b and are defined by axes of symmetry A and A' intersecting at vertical axis B that passes through a threaded opening 29 in the broad wall 27a that permits the user to screwably engage the table 21 relative to the tripod 11 of FIGS. 1 and 2, i.e., returning to FIGS. 1 and 2, the user attaches the table 21 to the seating pad 15 of the tilting head 14. Such attachment forms the basic building block of the work station 10 of the invention. The work spaces 30, 40 and 50 are next created using the work space 20 as the basic building block, such work spaces 30, 40 and 50 being created in any order although for descriptive purposes the following order has been chosen.

WORK SPACE 30

Figure 4:
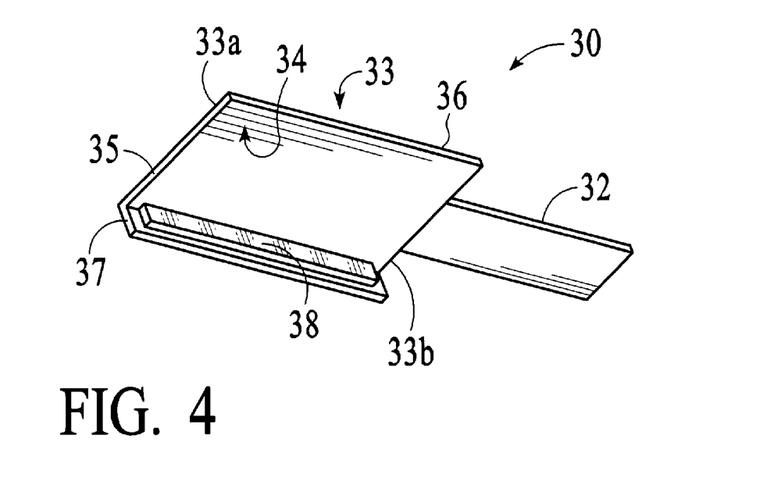
FIG. 4 is frontal oriented perspective detail of a first planar base rotated about 90 degrees from its position in FIG. 2 to better show a lip of such base.

Returning to FIGS. 1 and 2, work space 30 is next generated to either side of the work space 20 by the user using inner space 31 (see FIG. 3) of either one of the longitudinal legs 26a, 26b to disconnectably connect same to a extension header 32, see FIG. 4, the latter in turn being permanently attached to undersurface 33a of first extension planar base 33 of rectangular cross section. Assuming a left-handed work space 30 is needed, the user creates the work space 30 by inserting the extension header 32 into the inner space 31 of longitudinal leg 26a and causing relative movement until side 33b of first extension planar base 33, is snugly positioned within the receiver 26 of the planar table 21. Note that the extension header 32 is also of rectangular cross section and is sized to snugly nested within inner space 31 of the longitudinal leg 26a so that the planar base 33 is sufficiently supported during operation of the work station 10. The planar base 33 is seen in FIG. 4, to include a broad upper surface 34 terminating in long and short sides 35, 36 wherein a lip 37 is formed at long side 35. Such lip 37 also receiving a rubber insert 38 therealong. Returning to FIG. 2, note that the lip 37 is parallel to the lip 22a of the planar table 21. The purpose of the work space 30: to provide support for various computer peripherals including a mouse 17a, see FIGS. 2 and 5; a speaker 17b (FIG. 6) and a disc drive peripheral 17c, see FIG. 7.

WORK SPACE 40

Figure 7:
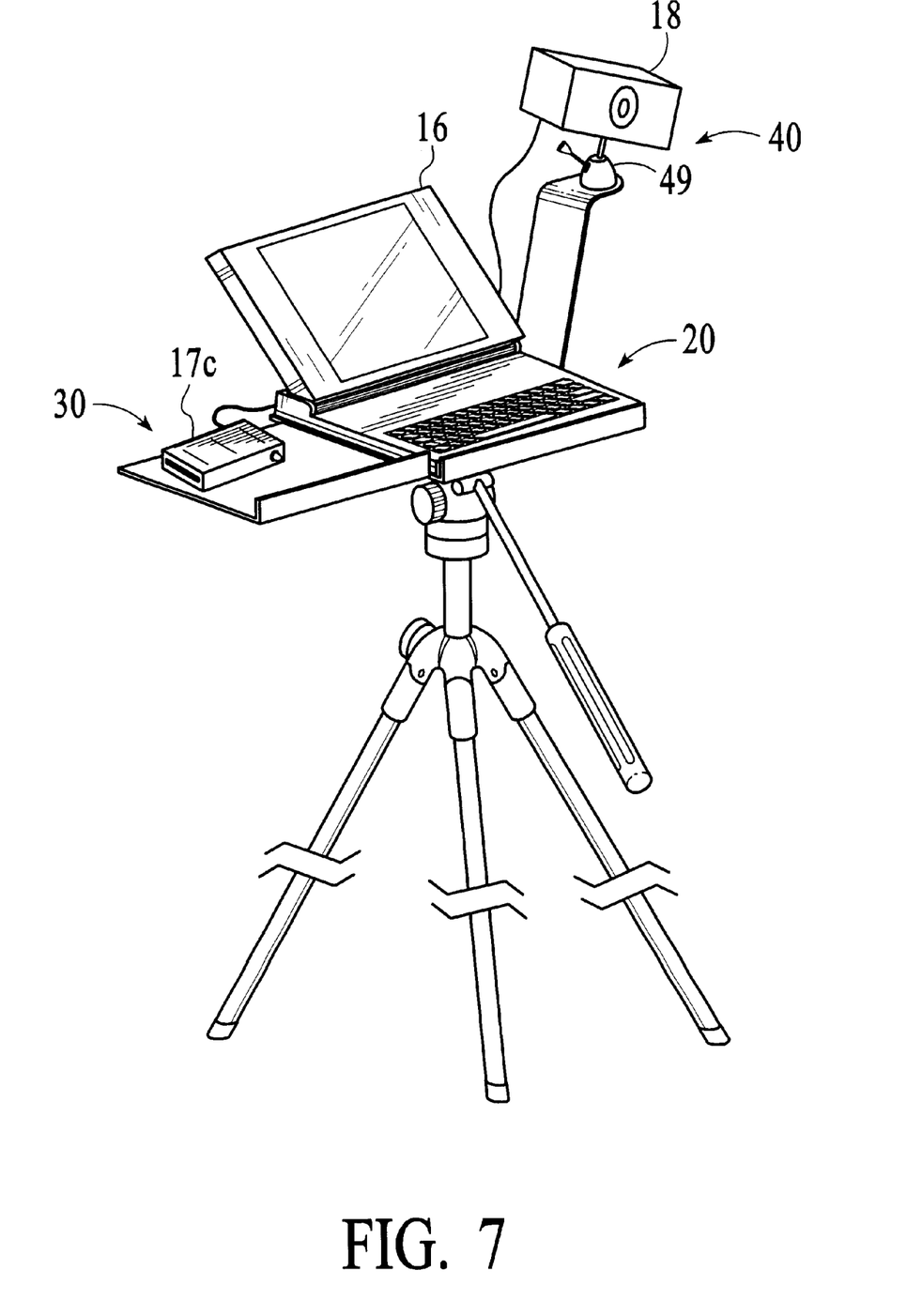
FIG. 7 is a frontal oriented perspective of the first, second and third work spaces of FIG. 2 showing an alternative combination of the laptop computer of FIG. 5 and a disk drive as well as the third work space featuring an optical recording device.
Figure 8:
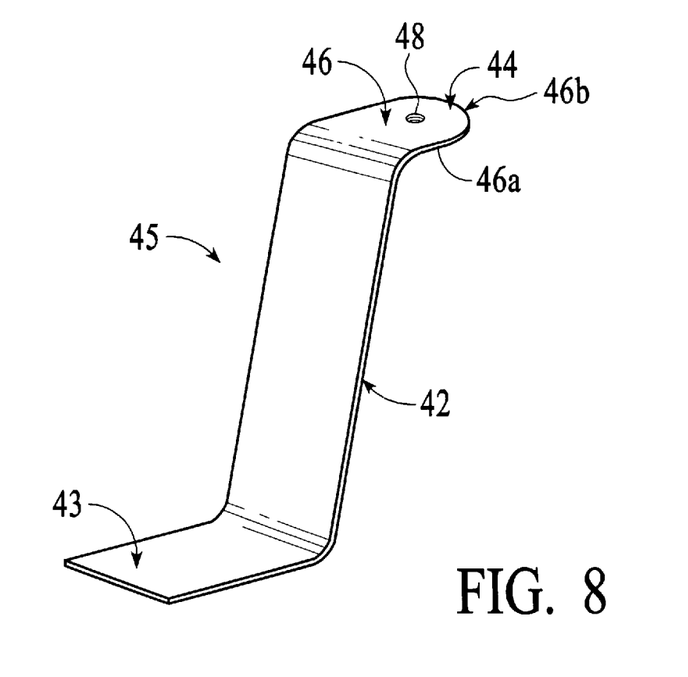
FIG. 8 is a frontal oriented perspective detail of a Zee-shaped extension arm used in and featured relative to the third work space of FIGS. 2 and 7.

Returning to FIGS. 1, 2 and 7, work space 40 is then generated at the remaining side (viz., the right-hand side) of the work space 20 by the user using inner space 41 of the longitudinal leg 26b of the receiver 26 to disconnectably connect same to a Zee-shaped extension arm 42. Such attachment occurs when near end 43 (see FIG. 8) of the Zee-shaped extension arm 42 is inserted within the inner space 41 of the leg 26b of FIG. 1 and there is sufficient relative movement to snugly nest near end 43 of the Zee-shaped arm 42 within a portion of the longitudinal leg 26b of the receiver 26. As shown best in FIG. 8, near end 43 of the Zee-shaped arm 42 is connected to distal end 44 through an uprising mid-portion 45. Such distal end 44 includes a broad upper surface 46 that terminates in side surfaces 46a and a curved front surface 46b. An opening 48 through the upper surface 45 permits of a conventional 3-d tripod head mount 49 of FIG. 2 such as a ball-in-socket model 3009 from Bogen Photo Corporation, Ramsey, N.J., to which a optical recording device such as a camera 18, see FIG. 7, is disconnectably attached.

WORK SPACE 50

Figure 9:
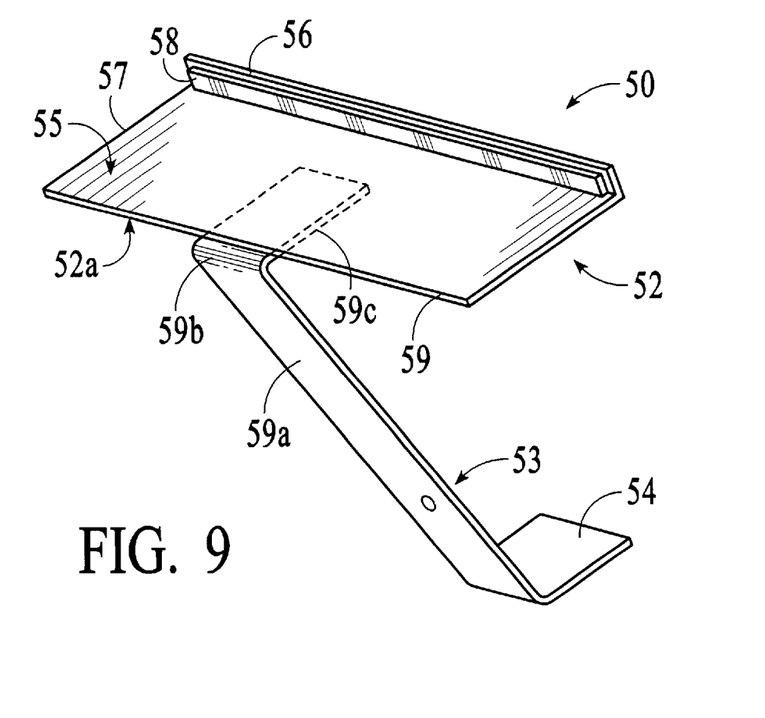
FIG. 9 is a rearward oriented perspective detail of a second planar base used in and featured relative to the fourth work space of FIGS. 1 and 2.
Figure 10:
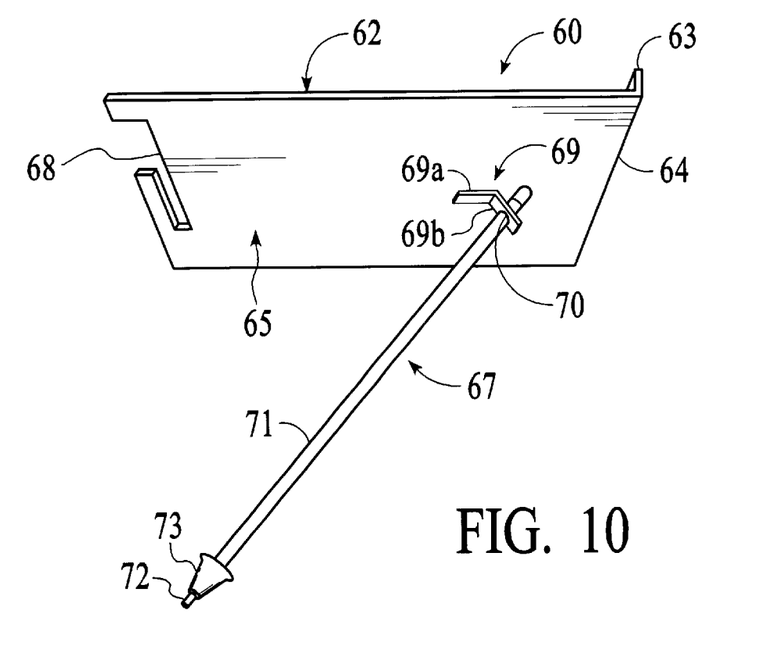
FIG. 10 is a bottom oriented perspective detail of a paper tray used in and featured relative to the fourth work space of FIGS. 1 and 2.

Returning to FIGS. 1 and 2, work space 50 is finally generated at the rear (viz., to the back of the work space 20) wherein inner space 51 of the transverse leg 26c of the receiver 26 to disconnectably connect same to a second planar base 52 through a U-shaped extension arm 53, the latter being permanently attached to undersurface 52a of the second planar base 52 of rectangular cross section. Attachment of the extension arm 53 to the transverse leg 26c, occurs when near end 54 (see FIG. 10) of the extension arm 53 is inserted within the inner space 51 of the leg 26c and there is sufficient relative movement to snugly nest near end 54 of the arm 53 within a portion of the transverse leg 26c of the receiver 26 of FIG. 1, transporting the second planar base 52 to a elevation above the work space 20. The second planar base 52 has an upper surface 55 terminating in a lip 56 along a long side 57 for the purpose of supporting printer 19 (or similar type device). As shown in FIG. 9, the upper surface 55 is provided with a non-skid strip 58, or other type of attaching means such as the Velcro-type devices, previously mentioned at the lip 56 for printer 19 whose support is aided by gravity relative to the second planar base 52 as shown.

Returning to FIGS. 1 and 2, note that many printers 19 such as the Cannon Model BJC-50000 Jet Printer manufactured by the Cannon Corporation, have attached paper trays that extend over rear long side 59 of the second planar base 58. However, when the printer used does not have an attached paper tray, a separate paper tray 60 can be added. Such paper tray 60 cantilevers from the U-shaped extension arm 53 and is seen to be of a rectangular cross section having an upper surface 62 terminating in a lip 63 along one of the long sides 64 and a lower surface 65, the paper tray 60 slidably attaching to the U-shaped extension arm 53 at two locations: about mid-region 59a of the U-shaped extension arm 53 via a rod assembly 67 and to corner 59b at the intersection of the mid-region 59a and upper terminus 59c via a L-shaped slot 68, see FIGS. 2 and 10. Such rod assembly 67 of FIG. 10 includes a L-shaped support 69 having a first arm 69a see FIG. 10, permanently attached to the lower surface 65 of the paper tray 60 and a second arm 69b carrying an opening 70 of circular cross section through which a rod 71 also of circular cross section, extends. Distal end 72 of the rod 71 is provided with a conically shaped stop 73 (usually of rubber) forward of the former, such distal end 72 also extending into and through an opening 74 (see FIG. 2) in the mid-region 59a of the U-shaped extension arm 53. Purpose of the planar paper tray 60: to provide a receiving area for printed pages from the printer.

As previously mentioned in relation to FIGS. 1 and 2, the portable laptop computer work station 10 of the invention is supported via the conventional camera tripod 11, such as shown in DES. 263, 147 for "Tripod" issued Feb. 23, 1982 that includes universal tiltable head 14 including seating pad 15. Such tiltable head 14 permits correct positioning of the work spaces 20, 30, 40 and 50 relative to the earth's surface 80.

Figure 5:
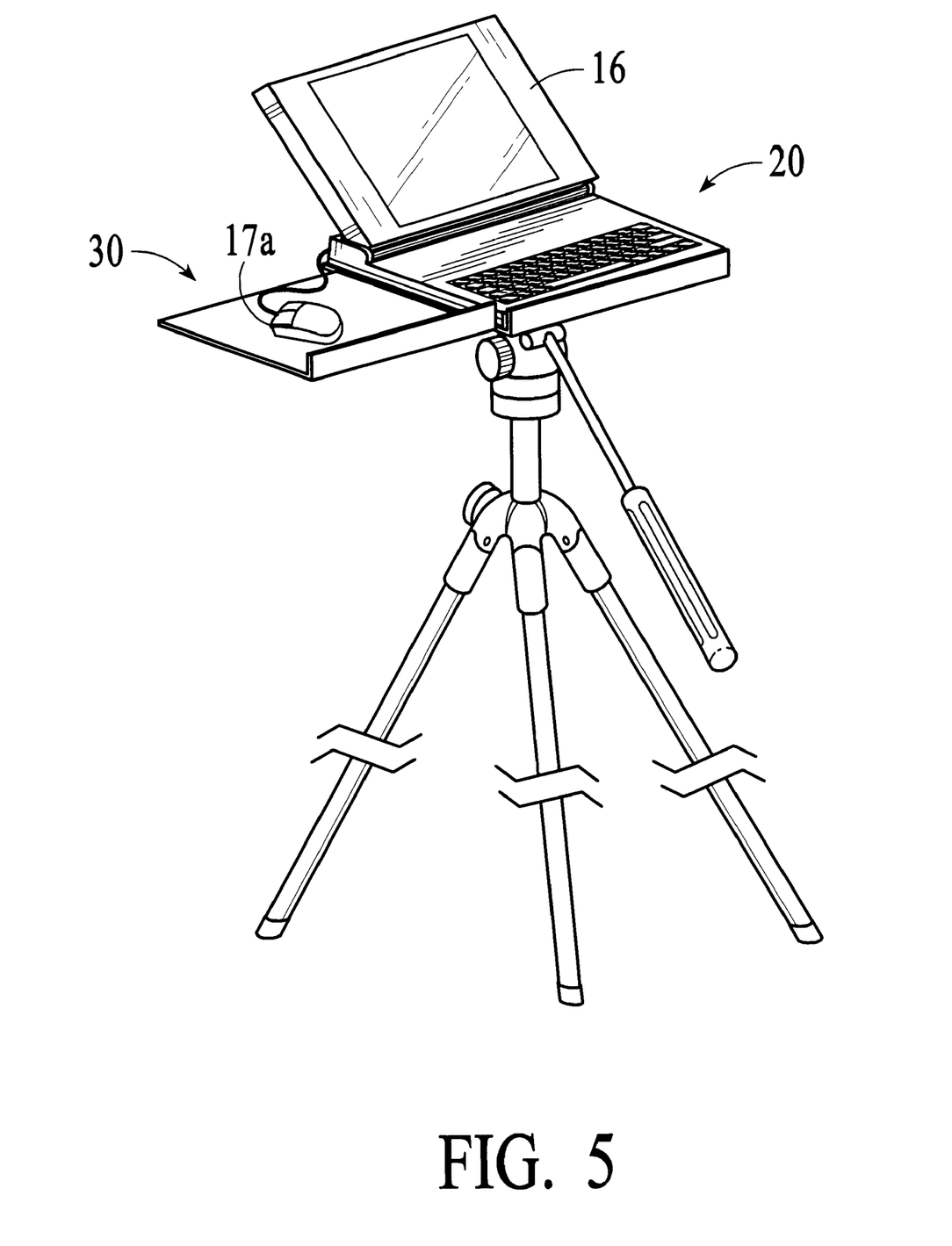
FIG. 5 is a frontal oriented perspective of the first and second work spaces of FIG. 2 showing the combination of a laptop computer and a computer mouse.
Figure 6:
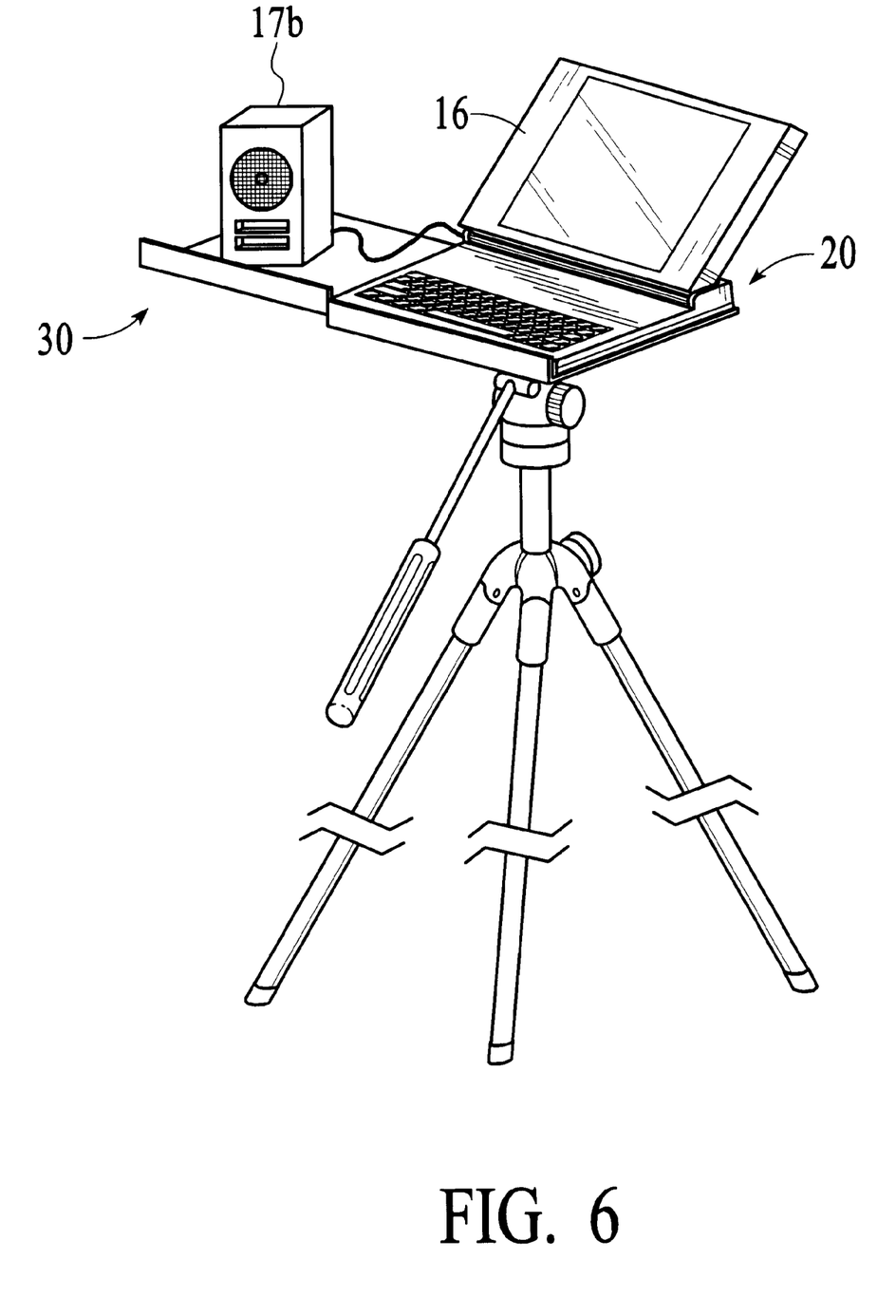
FIG. 6 is a frontal oriented perspective of the first and second work spaces of FIG. 2 showing an alternative combination of the laptop computer of FIG. 5 and a speaker.

That is, the tiltable head 14 is manipulated to cant the planar table 21 carrying the laptop computer 16 (forming the first work space 20) and first planar base 33 carrying a mouse 17a, see FIGS. 2 and 5; a speaker 17b (FIG. 6) or a disc drive peripheral 17c, see FIG. 7 (and forming the second work space 30) at a correct interaction position for the user's hands so that the user can use all station elements from a seated or standing position as well as:

positions the Zee-shaped extension arm 42 carrying the camera 18 (and forming the third work space 40) and the second planar base 52 supporting the printer 19 (and forming the fourth work space 50) in positions that are parallel to the earth's surface 80 of FIG. 1, and positions the planar paper tray 60 at a cant opposite to that of the laptop computer 16 to receive the printed pages of the printer 19.

ALTERNATIVE

Figure 11:
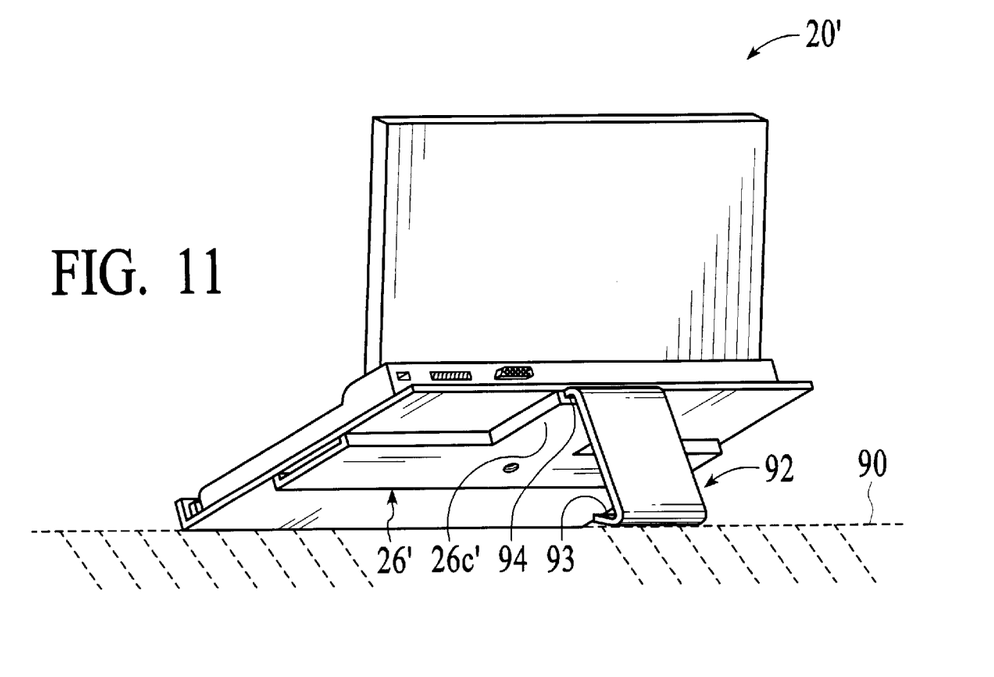
FIG. 11 is a rearward oriented perspective detail showing an alternate embodiment of the invention.
Figure 12:
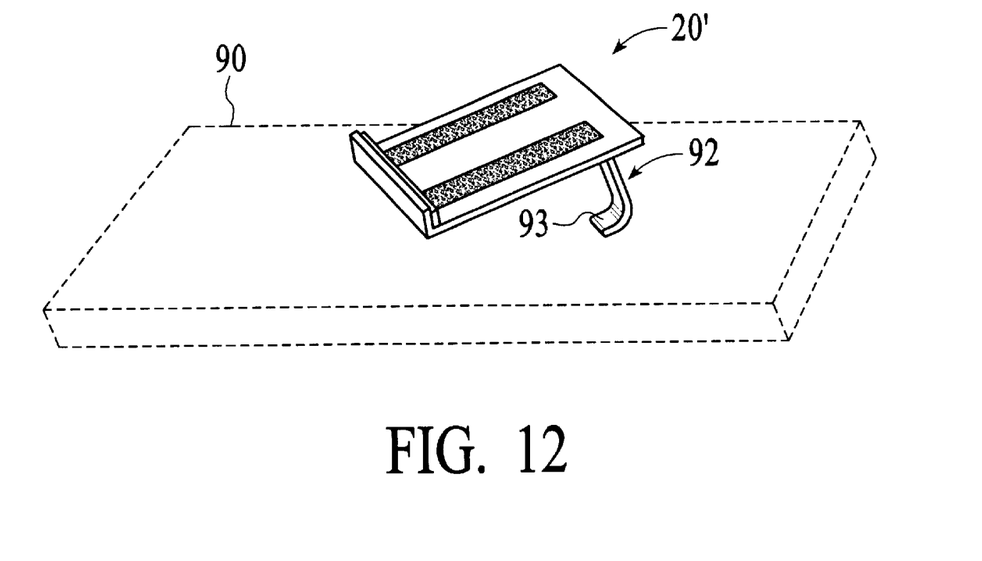
FIG. 12 is a sideways oriented perspective detail of the embodiment of FIG. 11.
Figure 13:
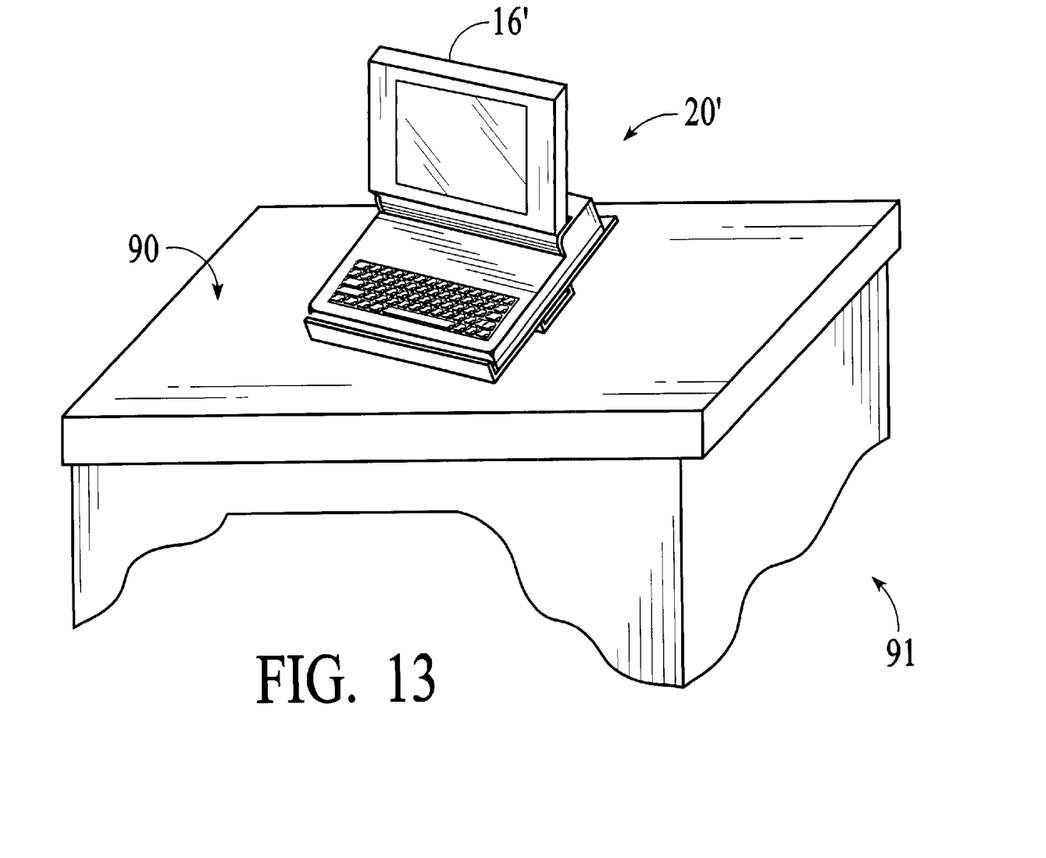
FIG. 13 is a frontal oriented perspective detail of the embodiment of FIGS. 11 and 12.

As shown in FIGS. 11–13, a work space 20' can be created using a conventional horizontal surface 90 such as provided by a desk 91 of FIG. 13, table etc. without the need of the camera tripod. In this alternative embodiment, the planar table 21' previously described with reference to FIGS. 1–3, is used for support of the laptop computer 16' using a U-shaped support 92 of FIGS. 11 and 12 having at first arm 93 in contact with the horizontal surface 90 and a second arm 94 that fits within the transverse leg 26c' of the Tee-shaped receiver 26'.

METHOD ASPECTS

It is assumed that the user will transport all elements comprising the portable laptop computer work station of the invention as broken-apart, stand-alone units and then assemble them together to form such work station at the remote work site. In this regard, the method of assembly will consist of the following steps:

(i) setting up a conventional camera tripod having a tiltable head at the remote work site, (ii) releasably securing a planar table of rectangular cross section relative to tiltable head of said camera tripod wherein the planar table includes an upper surface for receiving a laptop computer and terminating in a lip along a long side and a lower surface fitted a Tee-shaped receiver having a pair of longitudinal legs parallel to said lip and a transverse leg normal to said lip, (iii) releasably attaching a second work space to a side of said first work space, extending from one of said pair of longitudinal legs of said Tee-shaped receiver including a first extension planar base of rectangular cross section having an upper surface for support of a computer peripheral including a computer mouse and a lower surface, said extension planar base including an extension header permanently attached to said lower surface and extending beyond a short said of said first extension planar base to form a distal end in releasable nesting contact with said one of said pair of longitudinal legs of said Tee-shaped receiver, said upper surface of said extension planar base also terminating in a lip that is parallel to said lip of said planar table of said first work space, (iv) releasably attaching a third work space extending from another of said pair of longitudinal legs of said Tee-shaped receiver including a Zee-shaped extension arm of rectangular cross section having a near end that slidably and releasably nests within said another of said pair of longitudinal legs and distal end that supports the optical recording device, (v) releasably attaching a fourth work space extending from said transverse leg of said Tee-shaped receiver including a second planar base having an upper surface for support of a computer driven printer and a lower surface, said extension planar base including an U-shaped extension arm having a distal end permanently attached to said lower surface and a near end that slidably and releasably nest within said transverse leg of said Tee-shaped receiver, said upper surface of said second planar base also terminating in a lip that is parallel to said lip of said planar table of said first work space.

Thereafter the user will load the work stations with the computer related items such as taught by the following steps although the order can vary:

placing a laptop computer onto the upper surface of the planar table of the first work space;

placing a computer peripheral onto the upper surface of the first planar base of the second work space;

placing the optical recording device onto the distal end of the Zee-shaped extension arm of the third work space;

placing a computer driven printer onto the upper surface of the second planar base of the fourth work space.

While the invention has been described with sufficient clarity to enable one skilled in the art to make and use the same, it is evident that such person would be aware of certain modifications and additions that could be made thereto. Such modifications and additions are sought to be included within the spirit of the following claims.

What is claimed is:

1. A portable laptop computer work station comprising (i) a first work space that includes a planar table having an upper surface for receiving a laptop computer, said upper surface terminating in a lip along a long side of said table, and a lower surface fitted a Tee-shaped receiver having a pair of longitudinal legs parallel to said lip and a transverse leg normal to said lip, (ii) a second work space positioned to a side of said first work space, releasably extending from one of said pair of longitudinal legs of said Tee-shaped receiver including a first extension planar base having an upper surface for support of a computer peripheral including a computer mouse and a lower surface, said extension planar base including an extension header permanently attached to said lower surface and extending beyond a short said of said first extension planar base to form a distal end in releasable nesting contact with said one of said pair of longitudinal legs of said Tee-shaped receiver, said upper surface of said extension planar base also terminating in a lip that is parallel to said lip of said planar table of said first work space (iii) a third work space extending from another of said pair of longitudinal legs of said Tee-shaped receiver including a Zee-shaped extension arm having a near end that slidably and releasably nests within said another of said pair of longitudinal legs and distal end that supports an optical recording device, (iv) a fourth work space extending from said transverse leg of said Tee-shaped receiver including a second planar base having an upper surface for support of a computer driven printer and a lower surface, said extension planar base including an U-shaped extension arm having a distal end permanently attached to said lower surface and a near end that slidably and releasably nest within said transverse leg of said Tee-shaped receiver, said upper surface of said second planar base also terminating in a lip that is parallel to said lip of said planar table of said first work space.

2. The portable laptop computer work station of claim 1 with the addition of a camera tripod having a tiltable head releasably attached to said Tee-shaped receiver of said first work space.

3. The portable laptop computer work station of claim 2 in which said planar table of said first work space is of rectangular cross section.

4. The portable laptop computer work station of claim 2 in which said first extension planar base of said second work space is of rectangular cross section.

5. The portable laptop computer work station of claim 2 in which said second Zee-shaped extension arm of said third work space is of rectangular cross section.

6. The portable laptop computer work station of claim 2 in which said second planar base of said fourth work space is of rectangular cross section.

7. A method of assembly of a portable laptop computer work station at a remote work site comprising the steps of (i) setting up a conventional camera tripod having a tiltable head at a remote work site, (ii) releasably securing a planar table of rectangular cross section relative to tiltable head of said camera tripod wherein the planar table includes an upper surface for receiving a laptop computer and terminating in a lip along a long side and a lower surface fitted a Tee-shaped receiver having a pair of longitudinal legs parallel to said lip and a transverse leg normal to said lip, (iii) releasably attaching a second work space to a side of said first work space, extending from one of said pair of longitudinal legs of said Tee-shaped receiver including a first extension planar base of rectangular cross section having an upper surface for support of a computer peripheral including a computer mouse, speakers, and disk drive, and a lower surface, said extension planar base including an extension header permanently attached to said lower surface and extending beyond a short said of said first extension planar base to form a distal end in releasable nesting contact with said one of said pair of longitudinal legs of said Tee-shaped receiver, said upper surface of said extension planar base also terminating in a lip that is parallel to said lip of said planar table of said first work space, (iv) releasably attaching a third work space extending from another of said pair of longitudinal legs of said Tee-shaped receiver including a Zee-shaped extension arm of rectangular cross section having a near end that slidably and releasably nests within said another of said pair of longitudinal legs and distal end that supports a digital camera, (v) releasably attaching a fourth work space extending from said transverse leg of said Tee-shaped receiver including a second planar base having an upper surface for support of a computer driven printer and a lower surface, said extension planar base including an U-shaped extension arm having a distal end permanently attached to said lower surface and a near end that slidably and releasably nest within said transverse leg of said Tee-shaped receiver, said upper surface of said second planar base also terminating in a lip that is parallel to said lip of said planar table of said first work space.

8. The method of assembly of a portable laptop computer work station at a remote work site of claim 7 with the additional step of placing a laptop computer onto the upper surface of the planar table of the first work space.

9. The method of assembly of a portable laptop computer work station at a remote work site of claim 7 with the additional step of placing a computer peripheral onto the upper surface of the first planar base of the second work space.

10. The method of assembly of a portable laptop computer work station at a remote work site of claim 7 with the additional step of placing an optical recording device onto the distal end of the Zee-shaped extension arm of the third work space.

11. The method of assembly of a portable laptop computer work station at a remote work site of claim 7 with the additional step of placing a computer driven printer onto the upper surface of the second planar base of the fourth work space.

* * * * *